United States Patent

[11] 3,541,916

[72] Inventor John E. Reid, Sr.
 152 S. Lincoln, Mundelein, Illinois 60060
[21] Appl. No. 814,874
[22] Filed March 10, 1969
 Continuation-in-part of Ser. No.
 698,703, Dec. 11, 1967, abandoned.
[45] Patented Nov. 24, 1970

[54] RHYTHM TEACHING MACHINE
 11 Claims, 25 Drawing Figs.
[52] U.S. Cl. .................................................. 84/484
[51] Int. Cl. ............................................. G10b 15/00
[50] Field of Search ........................................ 84/484,
 477, 470

[56] References Cited
UNITED STATES PATENTS
| | | | |
|---|---|---|---|
| 577,667 | 2/1897 | Steffens .................. | 84/470 |
| 1,664,010 | 3/1928 | Welch ..................... | 84/484 |
| 2,619,868 | 12/1952 | Moore et al. .............. | 84/484 |

Primary Examiner—Richard B. Wilkinson
Assistant Examiner—John F. Gonzales
Attorney—Russell N. Muehleman ABSTRACT: A machine for teaching timing to music students employs a manually-controlled low voltage powered, electrically or manually operated motor mechanism to advance a rhythm indicating lamp across a carriage at a smooth tempo while said lamp is viewed by the operator of the machine.

INVENTOR.
JOHN E. REID SR

Patented Nov. 24, 1970

3,541,916

Patented Nov. 24, 1970

RHYTHM TEACHING MACHINE

BACKGROUND OF THE INVENTION

1. Field of the Invention

My invention relates to teaching machines, and is particularly directed to music teaching machines which teach rhythm and which may be employed to practice exercises of rhythm series at various tempos.

2. Description of the Prior Art

The metronome is, of course, a well known tempo device which provides an audible as well as a visual indication of tempo. Another device for teaching rhythm series employs a series of wooden blocks of various width (according to the time width of the musical note indicated thereon) carried by a frame. As a resilient member is drawn across the series of blocks, a click is heard at only the beginning of each note and not during the correct time duration thereof. The ability of a student to draw the member in a smooth even stroke determines whether or not the precise rhythm is reproduced at a steady tempo. More sophisticated devices, such as record players, are also available to enable a student to see or hear a rhythm as it is played for the student.

A major drawback of the above devices is that they leave out a natural asset to music teaching, the foot-beat which all music teachers endeavor to get students to apply to performance in at least primary music instruction. In contract to previous techniques, my invention utilizes the foot-beat as the clock for controlling smooth rhythm presentations at any tempo a student wishes and for correct time durations of the notes thereof.

SUMMARY OF THE INVENTION

Briefly, my invention employs a stand, similar to a conventional music stand, having a frame to carry a plurality of translucent cards or an endless band having a plurality of translucent areas which have rhythms indicated on the front and an electrical code on the back thereof. A lamp which reads the electrical codes is carried behind the frame and advanced at a selected tempo by means of a foot-beat operated motor mechanism. By training in this manner regressive reading is minimized. In addition, a stimulus response is developed which is useful when the invention is used for students who play in large groups.

BRIEF DESCRIPTION OF THE DRAWINGS

The invention, its organization and construction will be best understood by reference to the following detailed description taken in conjunction with the accompanying drawings, which are exaggerated as an aid in describing the invention, and in which.

DESCRIPTION OF THE PREFERRED EMBODIMENT

Figure 1:
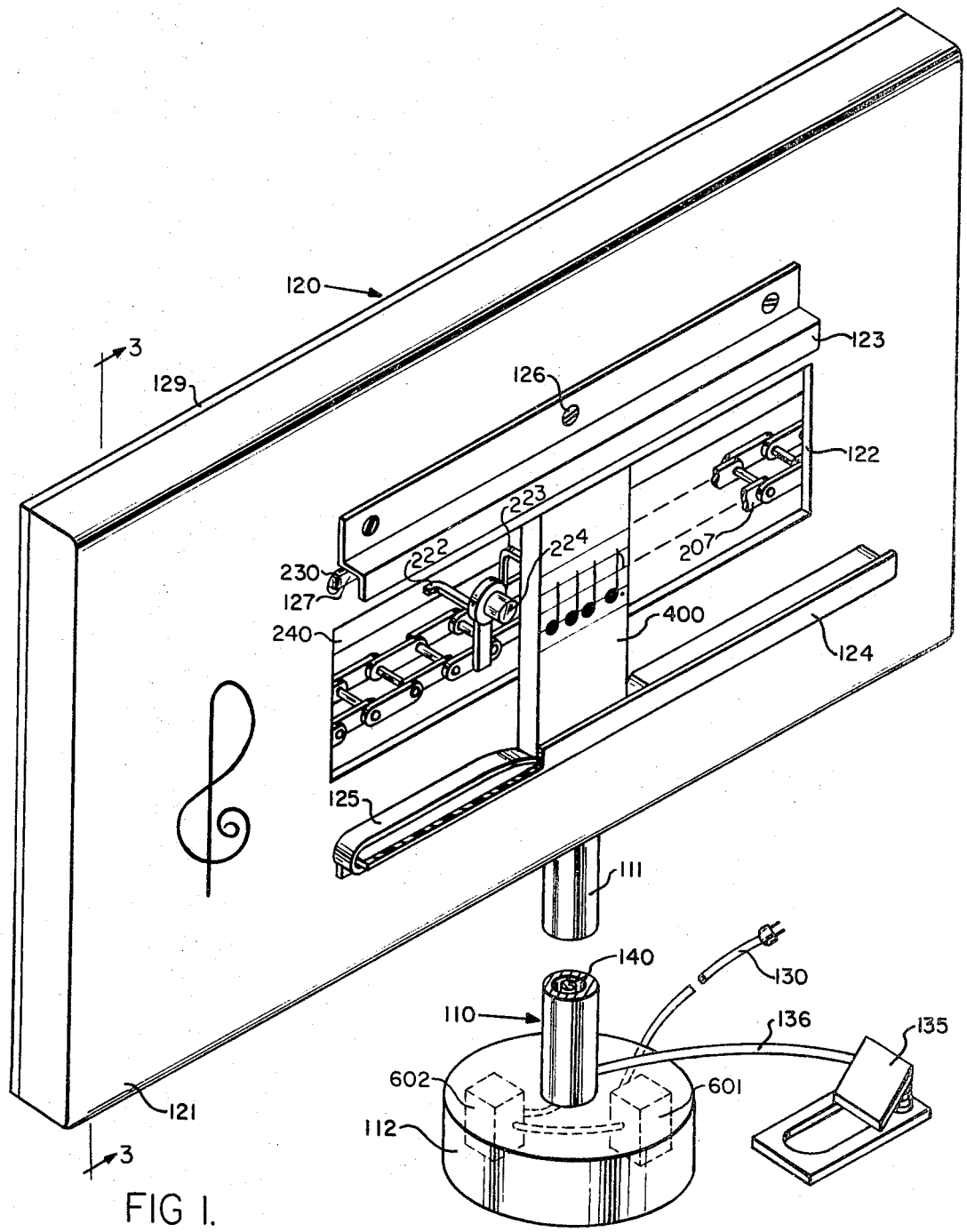
FIG. 1 is a pictorial view of the front of a teaching machine constructed in accordance with the teachings of the present invention.

Referring to FIG. 1, a frame is shown which comprises a standard 110 including a hollow post 111 and a base 112. Carried by the top of the standard is a card carrier frame 120 including a front board 121 having a window 122 therein. A card holder comprises top guide rail 123 and a bottom rail 124, the rails being secured to the front board by screws 126 or other suitable means. A spring 125 for holding the cards is disposed in rail 124. The front board 121 and the top and side frame section 128 may be constructed from separate pieces or may be of a one-piece molded configuration.

A power cord 130 provides the machine with conventional house current. A DC power supply could also be used without the converter which is described below. A foot switch 135 is connected to the base by a cord 136 to control the operation of the machine. Another cord 140 (or cords 130, 136) feed through the hollow post 111 to the motor mechanism which is mounted behind the front board. The converter (transformer 601 and rectifier 602) may be mounted in the base 112 as shown in phantom or may be mounted on the bottom frame section 128.

Figure 2:
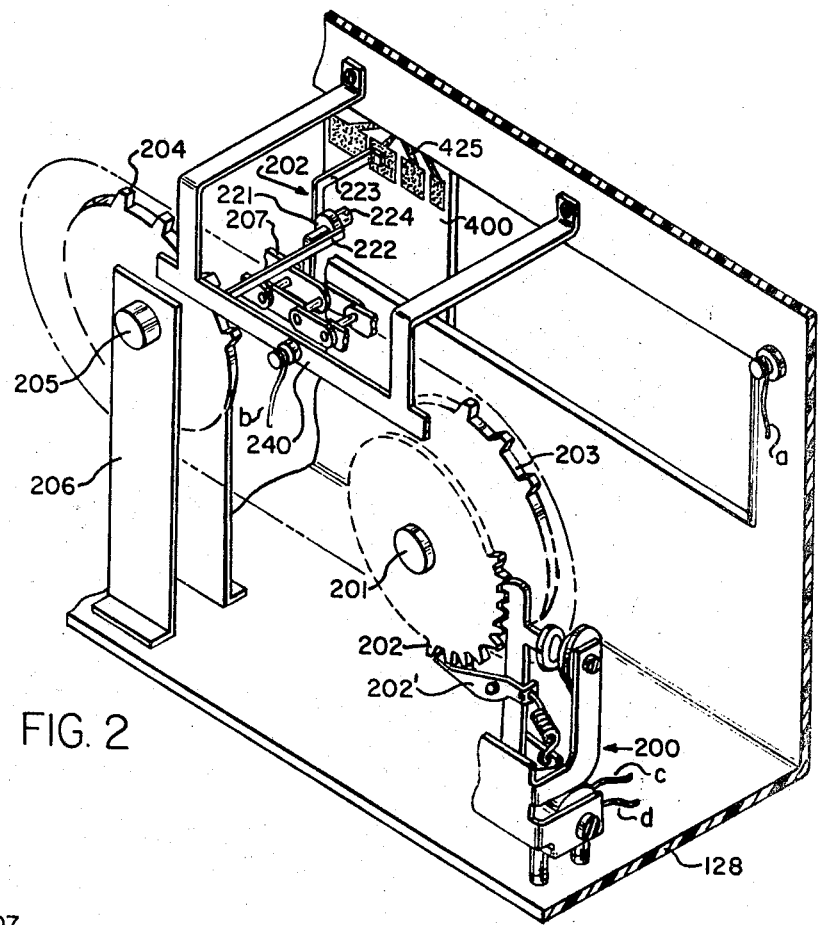
FIG. 2 is a fragmentary pictorial view of the rear side of the machine of FIG. 1.

Referring to FIG. 2, a drive mechanism is shown which comprises a rotary switch 200 mounted on the bottom frame section 128. A modified version of a Type 45 rotary switch by Automatic Electric Company of Northlake, Illinois could be employed. Carried by the shaft 201 with gear 202 (engaged by ratchet and pawl mechanism 202) is sprocket 203. Another sprocket 204 is mounted to the bottom frame section via shaft 205 and bracket 206 which is secured by any suitable means. A chain 207 (shown in partial phantom) embraces the sprocket 203, 204 and carries the lamp assemblies 202, only one of which is shown in FIG. 2.

Figure 6:
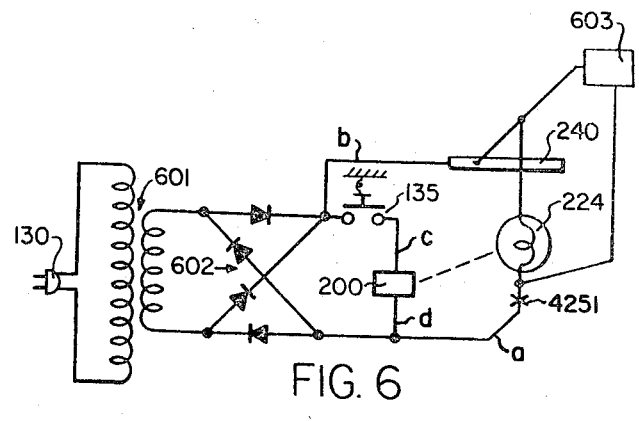
FIG. 6 is a schematic diagram of the powering circuit of the machine of FIG. 1.
Figure 9:
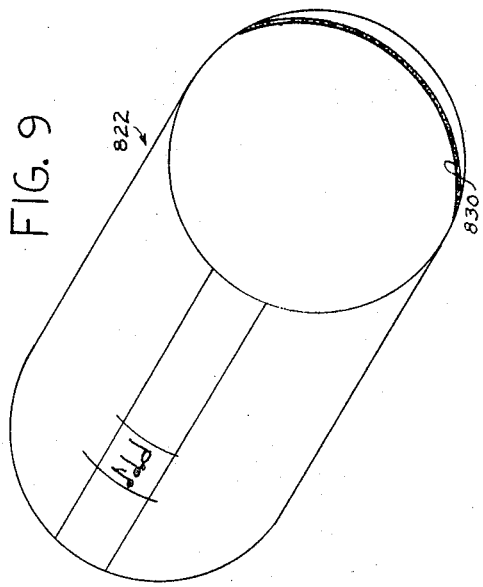
FIG. 9 is a pictorial representation of an endless coded band for use with the machine of FIG. 8.
Figure 8:
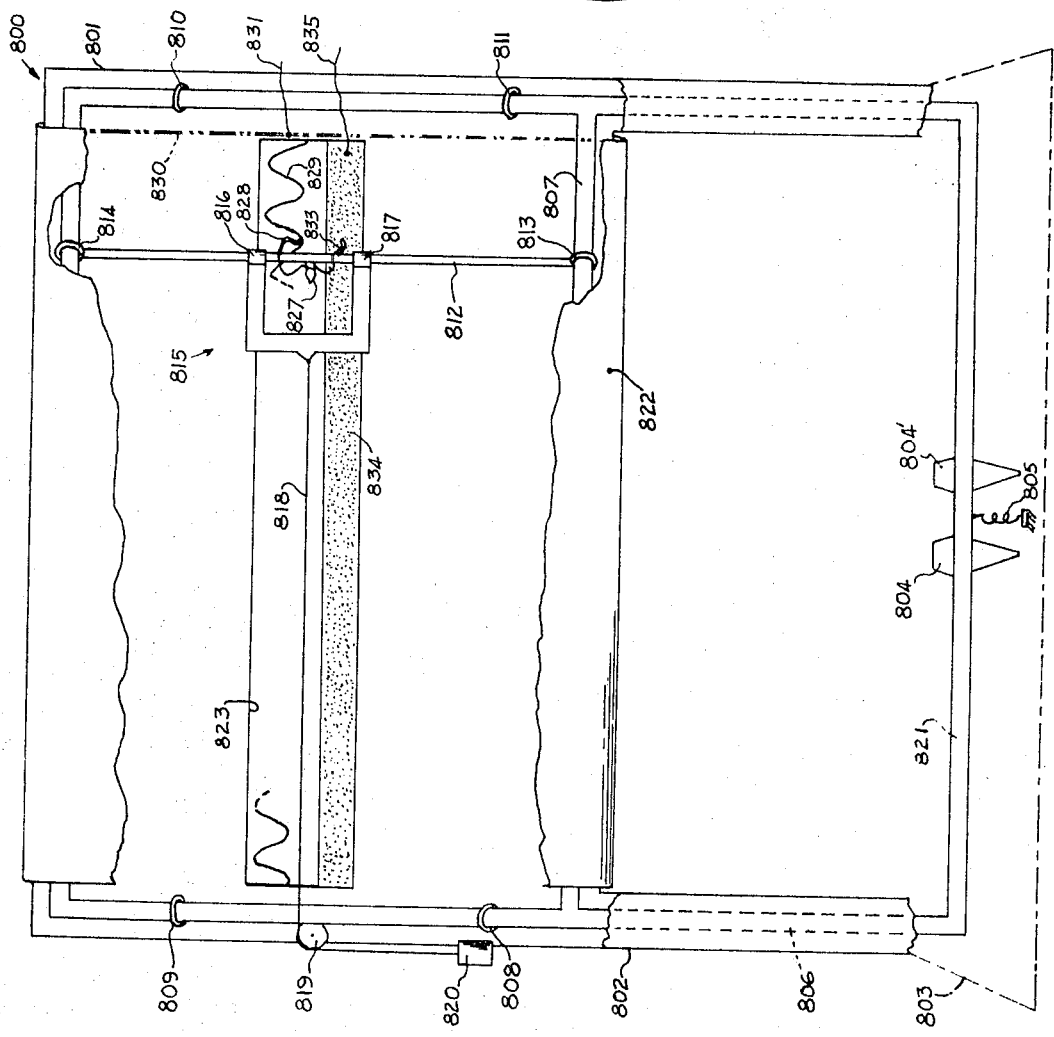
FIG. 8 is a rear view of another teaching machine constructed to employ an endless band which carries a plurality of translucent coded rhythm portions.
Figure 10:
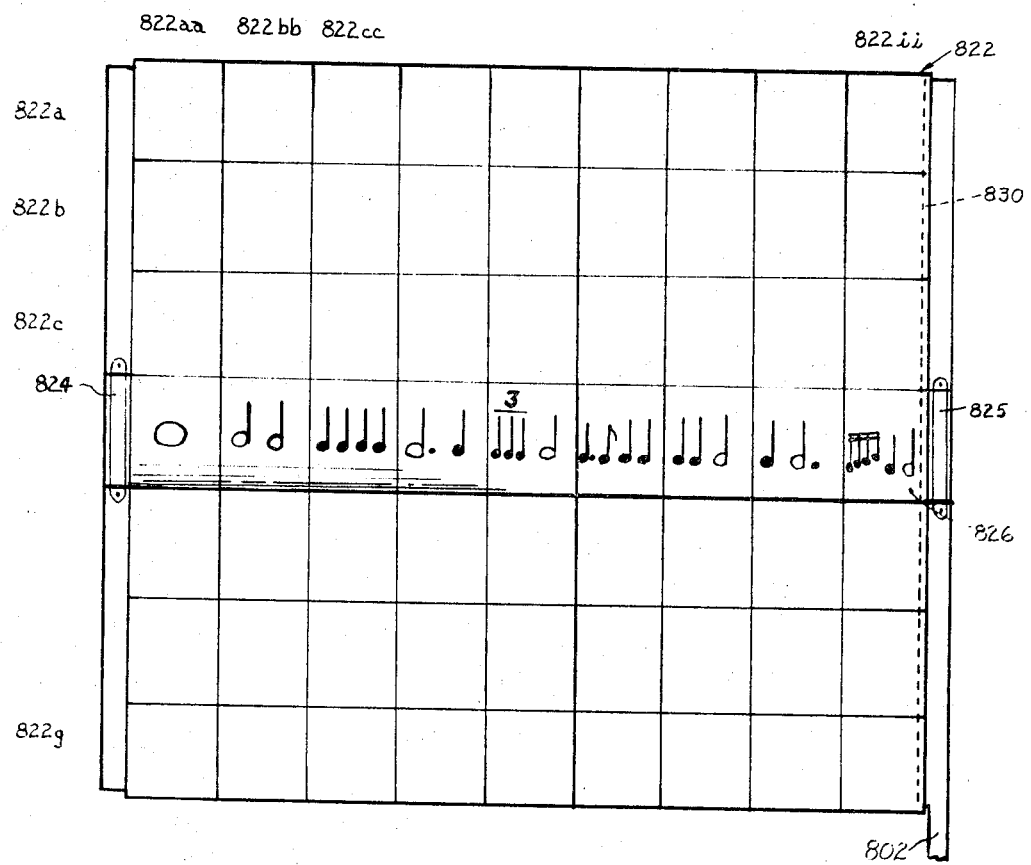
FIG. 10 is a front view of the machine of FIG. 8.
Figure 11:
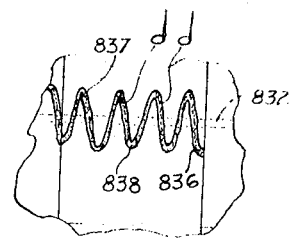
FIG. 11 is a fragmentary portion of an endless coded belt shown from the rear, illustrating one coding technique which may be employed in practicing the present invention.

Each lamp assembly 202 comprises a lamp holder 221, which may be welded or otherwise fastened to chain 207, having a contact wire 222 and a contact wire 223 which slide against bus 240 and coded contacts on the coded cards 400, respectively and a lamp 224. The lamp holder may be a slightly modified LEECRAFT Series 25-200, Type 25-208 with an S-type socket and a P-type base, Allied Radio part number 60A8980 and the lamp may be a General Electric Type 253 or 253X five-sixteenths inch (oval or rectangular beam cross section ⅜ inch from lamp) either of which is an optically-refined, high-output lens end lamp, Allied Radio part number 60A7957 or 60A7958, respectively. Cords 130 and 136 connect the power supply to the converter, rotary switch 200, bus 230 and bus 240. An audible indicating device could be connected in parallel with the lamp as shown in FIG. 6.

Figure 3:
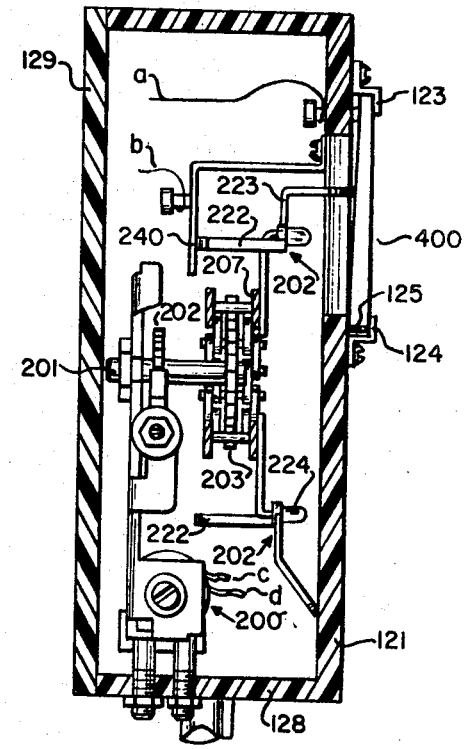
FIG. 3 is a cross section taken along the line 3–3 of FIG. 1.

FIG. 3 shows in cross section the drive mechanism of FIG. 2 and is fairly self-explanatory. It shows that sprocket 203 and gear 202 are aligned and operate together on shaft 201. The ratio of the radii of the sprocket and gear determine the linear displacement of the chain on each step which is related to the printed code on cards 400. Cards 400 are placed in the rails so that their printed circuit code sections may be wiped by contact 223; their common electrical pad being in contact with bus 230 as will be seen below.

Figure 4:
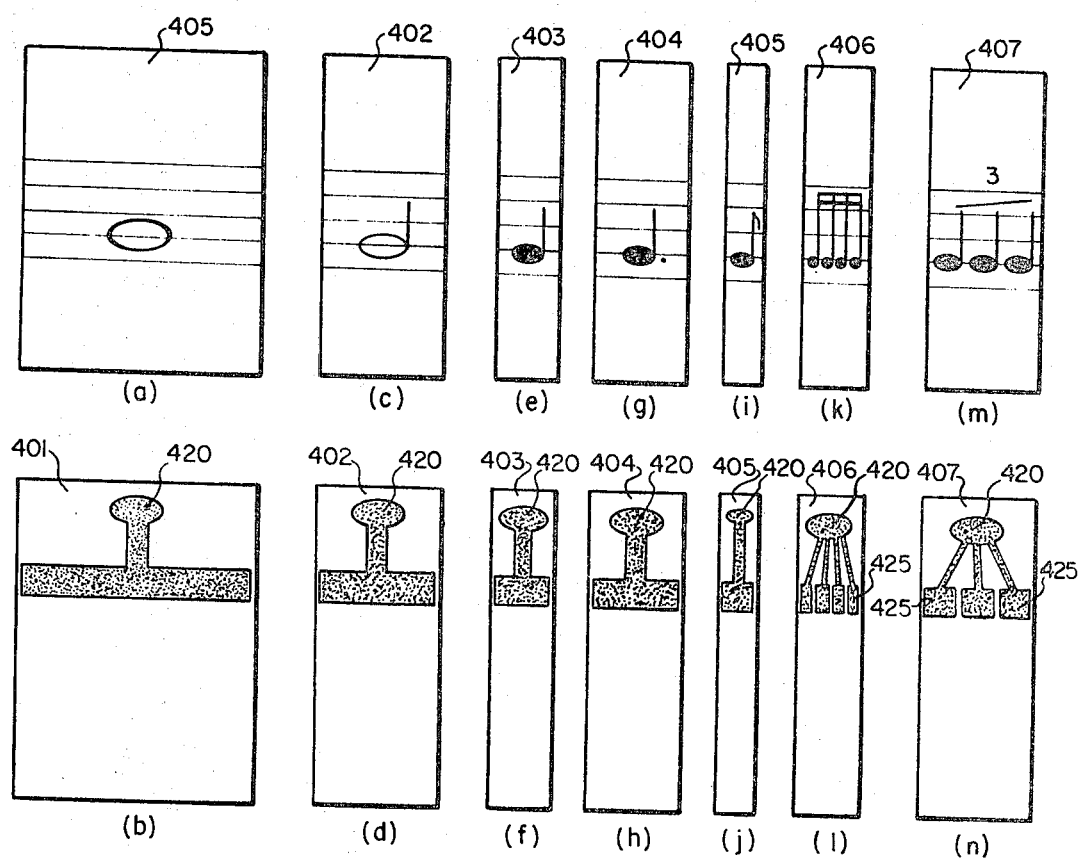
FIGS. 4a through 4n, 5a and 5b are front and rear views of coded rhythm cards for use in the machine of FIG. 1.

FIGS. 4a through 4n show a series of translucent cards coded 401—407, a paired with b, etc., the front side of the cards carrying a musical notation of the rhythm code and the back of the cards carrying the electrical code of the rhythm thereon in the form of printed circuits including a bus pad 420 for contacting bus 230 and code sections 425 corresponding to the time duration of the notes of the rhythms.

FIGS. 5a and 5b show another type of code card wherein a double lamp assembly and wipers would be employed; again, conductors 420, 425 indicate the time duration of the notes (rhythm) and conductors 430, 435 indicate the steady beats of the tempo.

FIG. 6 shows a simplified schematic diagram of the drive and control circuits comprising power cord 130, step down transformer 601, full-wave rectifier 602, the operating winding of stepping switch 200, foot-switch 135, lamp 224, bus 240 and buzzer 603. Contacts 425I symbolize the printed circuit sections 425.

Figure 7:
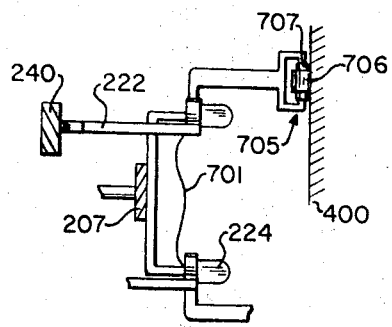
FIG. 7 is a pictorial view of a lamp assembly for use with the cards of FIG. 5.
Figure 5:
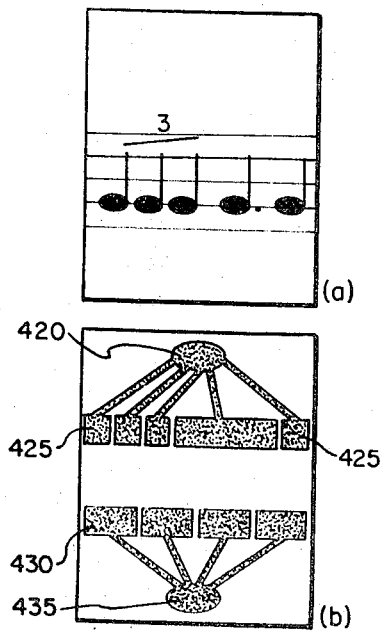

FIG. 7 shows a lamp assembly for use with the cards of FIG. 5. The bus 240 provides common electrical contact to both lamps, the lower lamp via conductor 701. A variation of the code contactor is shown in FIG. 7 as comprising a roller assembly 705 having a roller contact 706 carried by pin 707.

In operation a student would select a series of cards 400 from a card supply (not shown) placing them in the top and bottom rails 123, 124. Spring 125 holds the code conductor pad 420 against bus 239 then, while executing the rhythm by instrument, by humming, by clapping, etc., he provides a foot beat to switch assembly 135 at a desired tempo. The closing and opening of the powering circuit to rotary switch 200 causes the lamp assemblies to be stepped around the chain circuit adjacent the window 122. As contact 223 wipes bus 240, the lamp 224 flashes the rhythm which may be seen through the translucent card. The buzzer 603, if employed, would also sound for the duration of each note: also, a plurality of buzzers or tone sources of different pitch could be employed along with different vertical positionings of the strips 420 to sound each note.

ALTERNATE EMBODIMENTS

While my invention has been described by a specific illustration, alternative forms thereof may be made by one skilled in the art without departing from the spirit of the invention.

One such modification would be to use a purely mechanical motor mechanism. This could be accomplished by replacing the rotary switch with a mechanical linkage to the ratchet and pawl 202'.

Another variation would replace the sprockets and chain with a guide rail for the lamp which is indexed to a worm gear. A mechanical link between the foot-pedal pedal and an eccentric drives the worn gear. This device would need be reset however as the lamp assembly reached the distal end of the worm gear.

In keeping with the desire for low voltage on the cards and bus 230, a battery circuit could be used.

Another embodiment of my invention, and one which may be more desirable than the foregoing, is represented in the illustrations of Figs. a—11. In these FIGS. a stand 800 comprises a board portion 801 and a hollow leg portion 802 which terminates at its low end in a base 803 (shown in phantom having a foot pedal 804 and a spring 805 for biasing the foot pedal upwardly.

A motor mechanism for causing traversal of lamp 827 across the board includes a generally rectangular rigid frame member 807 having a depending rigid leg member 806 disposed within the stand leg 802. An orthogonal member 821 is coupled to foot pedal 804 to transfer the motion of the foot pedal to the frame member 807. Frame member 807 therefore reciprocates up and down in guide (or rollers) 808—811.

The motor mechanism further comprises a rod 812 which is slidably connected between the upper and lower sections of frame member 807 by bearings 813 and 814. A yoke 815 is slidably mounted on rod 812 by bearings 816 and 817 such that rod 812 may reciprocate in bearings 816 and 817 without imparting such motion to yoke 815.

A strand 818 connected to yoke 815 and directed over a pulley 819 is terminated with a weight 820. Weight 820 is effective to pull yoke 815 across the board portion 801 upon operation of the foot pedal 804.

Rod 812 also carries a lamp 827 connected to first and second wipers 828 and 833 between the legs of yoke 815. Wiper 833 contacts bus 834 which is connected to an electrical supply by lead 835. Wiper 828 rides in a groove 836 in an endless translucent coded belt 822. Groove 836 includes coded conductive strips 837 the time lengths of the rhythm indicia 840 on the front of the belt 822. The strips 837 are connected to an internal conductor 832 which is connected to a conductive bus strip 830 on the inside of the belt 822 near its edge for contacting supply lead 831.

As the foot pedal is operated, an up and down motion is supplied to the rod 812 by movement of the frame member 807 and a traversing motion is imparted to the rod 812 by the yoke-weight combination. The lamp 827 and wipers 828 and 833 are therefore moved across the board in an up and down fashion governed by the rhythm indicia.

The coded endless belt 822 comprises a plurality of code sections further referenced $a$, $b$, $c$, etc., which extend the length of the belt and each of which includes a plurality of measures, further referenced $aa$, $bb$, $cc$, etc., of corresponding musical timing, for example ¾ time or 4/4 time. A selected section, $822_d$ being illustrated is positioned in front of a window 823 of board portion 801 to be access by the wiper 828. A transparent, and if desired magnifying, member 826 holds the belt 822 in the selected position by spring clamps 824 and 825. This clamping action also insures a good electrical contact between bus 830 and supply lead 831.

I claim:
1. A rhythm teaching machine for operation in response to the tempo-setting foot-beats of a student, said machine comprising: a stand; a frame carried by said stand, said frame including a surface; means movably mounted on said surface including a series of musical notations thereon which define a rhythm and coded means thereon extending along a predetermined path, said coded means corresponding to said rhythm; foot-operated means; motor means carried by said frame, said motor means connected to and operated by said foot-operated means; code reading means carried by said motor means for movement along said path, said code reading means contacting said code means as said reading means moves along said path and including indicating means; and an electrical circuit for connection to a source of electrical energy including said code means and said indicating means, said indicating means being operated to indicate said rhythm as said code reading means contacts said coded means.

2. The machine defined in claim 1, wherein at least a portion of the first-mentioned means is translucent and said indicating means includes a lamp which traverses said path adjacent to said portion.

3. The machine as defined in claim 1, wherein said coded means includes a plurality of conductors, each of said conductors corresponding to a separate musical notation, the length of each said conductor being related to the time duration of the notation, each said conductor being spaced apart from and having a common electrical point connected to said source in said circuit with the other conductors of said plurality and said code reading means includes said indicating means and an electrical contact connected in series with said indicating means, said electrical contact sequentially contacting said plurality of conductors to operate said indicating means in accordance with said rhythm as said code reading means travels along said path.

4. The machine according to claim 1, wherein the first-mentioned means includes a plurality of separate code cards, each of said cards having musical notations thereon and each of said cards carrying a separate code means thereon comprising a conductor for each notation which is spaced apart from and electrically connected to said source, each of said cards being serially positioned on said surface of said frame to form a rhythm series of said notations and a corresponding rhythm series of said conductors.

5. The machine according to claim 1, wherein said surface has an aperture therein, the first-mentioned means includes a plurality of separate code cards carried on said surface in abutting relation, at least a portion of each card being translucent and each of said cards having a front side and a rear side, musical notations carried on the front side of each card to provide said series of musical notations which defines said rhythm when said cards are positioned on said surface, a code conductor carried on the rear side of a card for each musical notation on the front side thereof and spaced apart from any other similar code conductor on the same card to define said path and electrically connected to said source of electrical energy, and wherein said code reading means is mounted behind said surface and includes an electrical contact which extends through said aperture to contact said code conductors and said indicating means includes a lamp which is connected to said electrical contact and adapted to traverse said path adjacent said translucent portions, said lamp being operable to shine through said translucent portions as said code conductors are contacted by said electrical contact.

6. The rhythm teaching machine as set forth in claim 1, wherein said code reading means further includes a resilient contact member connected in series with said indicating means and adapted to slidably engage said coded means.

7. The rhythm teaching machine a as set forth in claim 1, wherein said code reading means further includes a contact member connected in series with said indicating means, said contact member including a roller adapted to roll across and electrically contact said coded means.

8. The machine as defined in claim 1, wherein said motor means includes means mounted to said frame for vertical reciprocation, means slidably carried by said motor means for vertical reciprocation, mounting means for mounting said code reading means, and means for moving said mounting means across said frame.

9. The machine as defined in claim 1, wherein said coded means comprises an endless belt carried about said frame including a plurality of coded sections, said belt being selectively positionable on said frame to contact said code reading means with a selected coded section.

10. The machine as defined in claim 9, wherein each of said coded sections comprises:
  a plurality of aligned code portions each of which includes:
    a rhythm indicia thereon;
    an undulating groove therein communicating with the grooves of adjacent portions to define said predetermined path as a series of undulating grooves which correspond to the foot operations of said foot-operated means; and
  a plurality of conductive strips disposed in said groove corresponding to the indicia on said code portion.

11. The machine according to claim 10, wherein said code reading means includes a contact element for following said series of undulating grooves and contacting the conductive strips therein, said contacting element connected to said indicating means.